United States Patent

Stiefel

[11] Patent Number: 5,659,608
[45] Date of Patent: Aug. 19, 1997

[54] LINE FEED CIRCUIT WITH LOGIC LEVEL CONTROLLED RINGING

[75] Inventor: Richard Frank Stiefel, Frelinghuysen Township, Warren County, N.J.

[73] Assignee: Lucent Technologies Inc., Murray Hill, N.J.

[21] Appl. No.: 574,418

[22] Filed: Dec. 15, 1995

[51] Int. Cl.⁶ ............................................. H04M 3/02
[52] U.S. Cl. ........................... 379/399; 379/377; 379/418
[58] Field of Search ..................................... 379/399, 413, 379/377, 373, 375, 418, 253, 252, 251, 412, 414

[56] References Cited

U.S. PATENT DOCUMENTS

| | | | |
|---|---|---|---|
| 4,510,550 | 4/1985 | Spires | 361/52 |
| 4,652,701 | 3/1987 | Cubbison, Jr. | 379/373 |
| 4,924,511 | 5/1990 | Burns et al. | 379/253 |
| 5,175,764 | 12/1992 | Patel et al. | 379/413 |
| 5,307,407 | 4/1994 | Wendt et al. | 379/413 |
| 5,341,416 | 8/1994 | Gammel | 379/382 |
| 5,509,068 | 4/1996 | Bayless et al. | 379/377 |

OTHER PUBLICATIONS

MC 33120 Motorolla Subscriber Loop Interface Circuit (SLIC) Data sheets, pp. 2-16 -2-224.

*Primary Examiner*—Krista M. Zele
*Assistant Examiner*—Jacques M. Saint-Surin

[57] ABSTRACT

A line-feed circuit which is controllable by logic level control signals from a local microprocessor. One of the logic level signals is a 20 Hz clock signal with a duty cycle of 20 ms high and 30 ms low. Another is an enable signal that allows the ringing driver either to be turned on (and which places the line-feed circuit into a disconnect or "open interval" state so as not to load the ringing signal) or off in which case the ringing driver is placed into a high impedance state so that it will not load signals appearing on the Ring conductor. This permits the ringing driver to be connected directly to the Ring conductor without the need for a series isolating element such as an electromechanical relay or comparable solid state device. The nature of the ringing driver allows the use of a simple ring trip detector comprised of a voltage comparator and duty cycle detector.

12 Claims, 2 Drawing Sheets

LINE FEED CIRCUIT WITH LOGIC LEVEL CONTROLLED RINGING

FIELD OF THE INVENTION

This invention relates to circuits for providing battery feed and ringing to telephone subscribers' lines (loops) and, more particularly, to the interface circuits (SLICs) serving such lines.

BACKGROUND OF THE INVENTION

A telephone line circuit, traditionally located at the telephone central office, provides a number of functions for the customer loop it serves. "BORSCHT" is the mnemonic frequently used to identify the principal ones of such functions: Battery feed, Over-voltage protection, Ring insertion, Supervision, Coding/decoding, Hybrid function, i.e., connection of two-wire subscriber line to the four-wire network, and Testing. In modern digital telephone switching systems, the testing of the customer loop may be performed during each call on demand in response to a complaint or on a routine/periodic basis. In a typical prior art central office switching system, such as the 5ESS Switch, per call tests are run using a "service circuit" under the control of peripheral software. Information on failures is passed to the appropriate maintenance software system. The central office switching system may perform additional tests by directly connecting a test unit to check the electrical parameters of the subscriber loop, by an automatic line insulation testing circuit or by a transmission test facility which contains DTMF testing circuitry.

The growing trend to the concentration of customer lines remote from the central office requires that BORSCHT functions be provided by line cards remotely located from the central office switch—with the result that the automatic testing equipment of the central office is no longer locally available to the line circuit. Accordingly, it would be desirable to provide a line interface circuit which could accomplish, in a self-contained manner, many of the testing functions priorly requiring the local availability of central office switching equipment. Additionally, it would be advantageous to reduce the cost and size of the line interface circuit without sacrificing reliability. In particular, it would be advantageous to eliminate the need for the electromechanical ringing relay that previously has been required to connect the ringing generator to the Tip and Ring conductors of the loop and to disconnect the remaining components of the line-feed circuit so that they would not load down the ringing signal.

It has heretofore been recognized that one of the relays in a conventional line interface circuit, namely the ringing relay, may be replaced by transistor circuitry, as in U.S. Pat. No. 4,652,701 issued Mar. 24, 1987 to R. J. Cubbison, Jr. The '701 patent employed a transistor feedback circuit to compensate for the imperfections inherent in semiconductor switches, principally the series impedance of the normally closed semiconductor switch contacts and parasitic capacitance that could couple in ringing signal when the transistor switch was inactive.

It has also been appreciated as shown, for example in U.S. Pat. No. 5,341,416 issued Aug. 23, 1994 to J. C. Gammel, that the rapid detection of the off-hook condition when the ringing signal is applied to the loop, i.e., high-speed ring trip, can be achieved monitoring the ringing signal polarity and cutting off the ringing current when it rises above a certain threshold during a particular polarity of the ringing voltage.

It would be of great advantage to provide a power-conserving, battery feed circuit which provided the usual BORSCHT functions under the control of a local microprocessor thereby permitting logic level control signals to be used. In particular, it would be advantageous to provide for a longitudinally ac balanced, current-regulated dc feed and a ringing waveform that not only permitted on-hook transmission during the silent interval of ringing but which could easily be tripped when the loop went off-hook and which required no electromechanical ringing relay to isolate the line feed from the ringing circuitry.

SUMMARY OF THE INVENTION

The foregoing and other objects and features of my invention are realized in an illustrative embodiment in which a power-conserving, loop start signalling, dual-voltage line-feed circuit maintains ac longitudinal balance on the loop conductors and which limits average and peak loop current not only when the loop is in the off-hook transmission state but also during the silent interval of ringing to permit on-hook transmission of information. The ringing waveform is generated from and controlled by microprocessor-supplied logic level signals. One of the logic level signals is a 20 Hz clock signal with a predefined duty cycle (illustratively, 20 ms high and 30 ms low) while other logic level signals allow the ringing driver to be turned on (while placing the line feed into a disconnect or "open interval" state so as not to load the ringing signal) or to be turned off and enter a high impedance state so that the ringing driver will not load the Ring conductor regardless of the potential on that conductor. Ringing is provided through current-limited ringing drivers providing a trapezoidal ringing waveform swinging from ground to the large negative voltage, (illustratively, −175 v dc). The nature of the ringing driver allows the use of a ring trip detector comprised of a voltage comparator and duty cycle detector.

BRIEF DESCRIPTION OF THE DRAWING

The foregoing objects and features may be come more apparent when the ensuing description is read together with the drawing in which.

GENERAL DESCRIPTION

Figure 1:
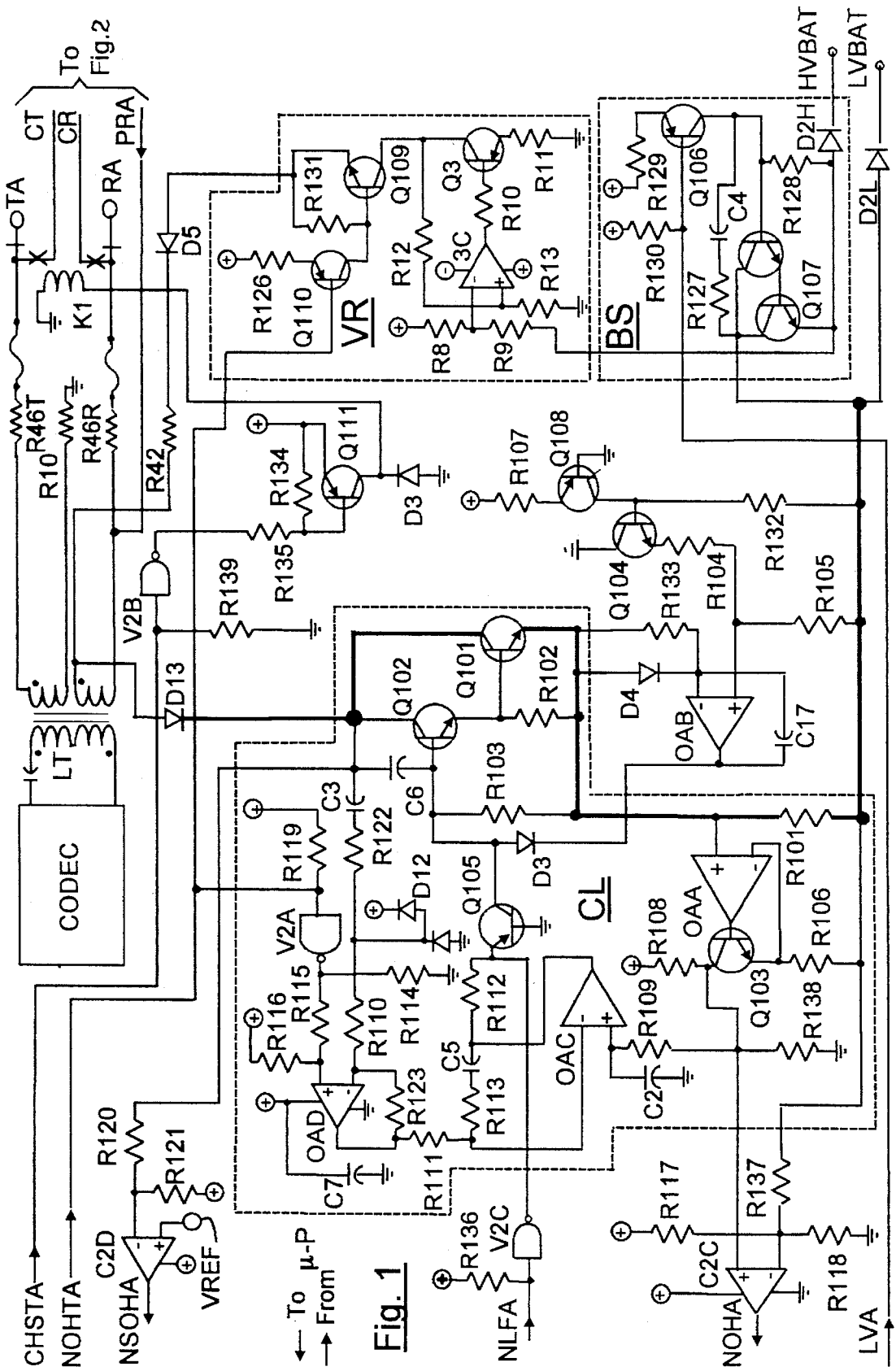
FIG. 1 shows a power conserving, current limited line feed circuit which provides a dual voltage dc source to the loop conductors while maintaining ac longitudinal balance during the off-hook state as well as during a predetermined interval following a burst of ringing for on-hook signaling purposes.
Figure 2:
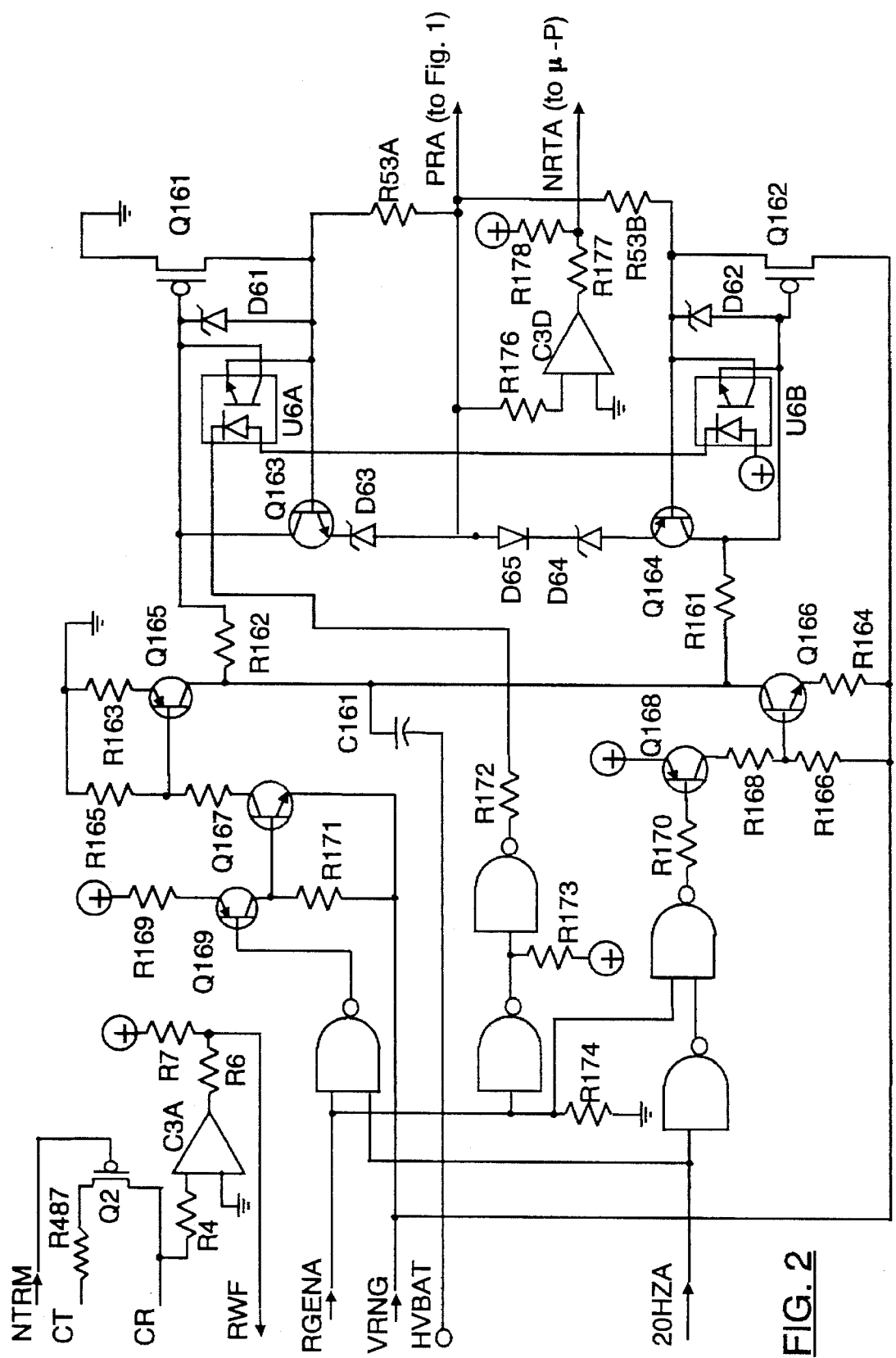
FIG. 2 shows the circuitry for generating the ringing waveform, for tripping ringing and for applying a resistive termination during channel test.

The portion of the line-feed circuit shown in FIG. 1 provides dual voltage battery feed and switch hook supervision to the Tip and Ring conductors of the subscriber's loop while the portion shown in FIG. 2 provides ringing waveform and ring trip. The principal components in FIG. 1 are the current limiter CL which limits the average and peak values of loop current and provides a virtual ac ground to the Ring conductor; battery switch BS which connects the line-feed circuit either to high voltage battery, illustratively −45 v dc, when the loop is on-hook or to low voltage battery, illustratively −25 v dc, when the line is off-hook; and a voltage regulated power supply VR which provides current to enable current limiter CL to maintain the virtual ac ground when the loop is in the on-hook condition. The circuitry of FIGS. 1 and 2 operates under the control of logic level signals from a microprocessor μ-P (indicated at the left-hand side of FIG. 1) which provides all of the input control signals and which receives all the status report signals appearing on the labeled leads at the left and right of FIGS. 1 and 2. A detailed list of all of the signals delivered to and from the microprocessor is set forth in Table 1 which appears at the end of the specification.

1. CURRENT LIMITER CL OPERATION— SUBSCRIBER LOOP OFF-HOOK

When the subscriber loop is in the off-hook condition (or, if the subscriber's loop is on-hook but no on-hook transmission is required), the microprocessor μ-p places lead NOHTA in the high state to complete the normal loop feed mode. The current path so completed may be traced from ground, resistor R10, the upper righthand side winding of line transformer LT, through resistor R46T, a fuse and the upper back contacts of the test relay to the Tip lead, thence through the external impedance of the loop and subscriber's telephone set (both not shown) to the Ring lead, the lower back contacts of the test relay, a fuse, resistor R46R, the lower half righthand side winding of line transformer LT. From the upper righthand side winding of line transformer LT the normal current path continues through forward-biased diode D13 into the current limiter circuit CL, the emitter-collector path of Darlington connected transistors Q102 and Q101 (whose conduction is initiated by the NOHTA signal), resistor R101 and forward biased diode D2L to low-voltage (negative) battery applied to lead LVBAT at the lower righthand side of FIG. 1.

The NOHTA signal causes current limiter circuit CL to monitor the current flowing in the subscriber's loop and to limit it to approximately 23 ma dc when the loop is off-hook. (When the loop is on-hook, circuitry to be hereinafter described limits the loop current to about 7 ma dc for on-hook transmission). More particularly, the microprocessor applies the NOHTA signal as a +5 volt (high) dc logic level signal to open-drain NAND gate V2A of current limiter CL. In addition, as will hereinafter be explained, the NOHTA signal is applied as well to the base of transistor Q110 of voltage regulator VR, back biasing transistor Q110 and inhibiting operation of the voltage regulator (which is used to supply current during on-hook transmission).

In current limiter CL, the NOHTA signal causes the output of open-drain NAND gate V2A to be driven low, effectively shunting out resistor R114 of the three-resistor voltage divider R116, R115 and R114 and changing the dc reference voltage at the non-inverting input of operational amplifier OAD from about +7.3 v dc to about +6 volts. A positive level of approximately 6 volts therefore appears at the output of operational amplifier OAD and this output is applied to the inverting input of operational amplifier OAC via resistor R111. Operational amplifier OAC compares this positive output level with the signal applied at its non-inverting input from resistor R109 which is connected to the junction of resistors R108, R138 and the collector of transistor Q103. The dc voltage at this junction point is controlled by conduction in transistor Q103 whose base drive is supplied by operational amplifier OAA in accordance with the dc voltage drop effected across resistor R101. As noted above, loop current passes through resistor R101 from the emitter-collector path of the Darlington connected transistors Q101 and Q102 and, therefore, the potential drop across resistor R101 is proportion to loop current. (When there is no loop current, the Darlingtons, as will hereinafter be explained, can be supplied with current by voltage regulated supply VR, in which case the voltage drop across resistor R101 can continue to be monitored by amplifier OAA).

The output of operational amplifier OAA supplies the drive for the base of transistor Q103. The emitter current of transistor Q103 produces a potential drop across resistor R106 that provides negative feed-back to the inverting input of operational amplifier OAA. The negative feedback causes operational amplifier OAA to produce a collector current through transistor Q103 that is proportional to the voltage developed across R101 which, in turn, is proportional to the loop current. The dc current in Q103, along with the voltage divider resistors R108 and R138, determines the dc voltage at the non-inverting input of operational amplifier OAC.

As previously mentioned, in response to the NOHTA signal, a positive 6 v reference voltage is applied at the inverting input of amplifier OAC. Operational amplifier OAC compares this positive 6 v reference voltage to the dc voltage at the junction of resistors R108, R138 and the collector of transistor Q103. Capacitor C2 shunts to ground any high frequency components so that operational amplifier OAC responds only to slowly varying level of dc current in the loop. The output of operational amplifier OAC, through resistor R112, provides the base current for common-base connected transistor Q105. Transistor Q105 provides the base drive for transistor Q102 of the Darlington connected pair of transistors. The base drive regulates the loop current to approximately 23 ma dc.

2. LOOP OFF-HOOK DETECTION

While in the normal loop feed mode (NOHTA is high), switch hook status detection is accomplished by comparator C2C shown in the lower left hand side of FIG. 1. The non-inverting input of comparator C2C is connected to the collector of transistor Q103 and senses a potential that is proportional to the amount of loop current flowing in the Darlington connected transistors Q101, Q102. The inverting input of comparator C2C is connected to the potential set up at the junction of resistors R117, R 118 and R137. If more than approximately 6 ma flows in the loop (and through Q101, Q102 and R101), the output of comparator C2C switches to the low state, thereby supplying the NOHA input signal to the microprocessor which declares the loop to be off-hook.

With the line-feed circuit of FIG. 1 in the on-hook transmission state, there may be insufficient current provided by the voltage regulated power supply VR to the Darlington transistors to develop enough potential across resistor R101 for operational amplifier OAA to drive transistor Q103 so that comparator C2C will reliably change the level on the NOHA lead to report the state of the loop to the microprocessor. In order to determine whether the subscriber loop has gone into the off-hook state while in the on-hook transmission state, comparator C2D at the upper left hand side of FIG. 1 is used to compare the voltage at the output of current limiter CL (the collector of the Darlington pair) via resistors R120 and R121 with the dc reference potential VREF applied at its non-inverting input. If the subscriber loop goes off-hook, the low impedance from Tip to Ring will cause the voltage at the collector of the Darlington transistors to become less negative. The voltage at the inverting input of comparator C2D becomes greater than the reference voltage VREF, causing the output of comparator C2D to go low. This output, NSOHA, tells the microprocessor to switch the line-feed circuit from the off hook transmission mode to the normal loop mode.

3. VIRTUAL AC GROUND PROVIDED BY CURRENT LIMITER CL

In addition to regulating the amount of dc current in the subscriber loop, current limiter CL employs ac feedback so that the ac impedance to ground for the Ring lead (looking from the dotted end of the lower right hand winding of line transformer LT), shall equal the ac impedance to ground for the Tip lead (looking from the undotted end of the upper right hand winding of line transformer). With respect to the Tip lead, the ac impedance to ground is provided substantially by resistor R10. For the Ring lead, the ac impedance is provided largely by the forward biased protection diode D13 and whatever impedance is provided by current limiter CL. Accordingly, for the ac impedances from Ring to ground to equal the ac impedance from Tip to ground, the ac impedance of current limiter CL (i.e., looking from the collector of the Darlington connected transistors Q101, Q102 to ground) must therefor be substantially zero. When current limiter CL provides substantially zero ac impedance to ground, the Tip and Ring conductors of the loop are provided with longitudinal ac balance.

Any ac signal appearing at the collector of the Darlington connected transistors Q101, Q102 is coupled through capacitor C3 and resistors R122 and R110 to the inverting input terminal of operational amplifier OAD. As mentioned above, a dc reference voltage (+6 v) is established at the output terminal of operational amplifier OAD. The inverted ac feedback signal, superimposed on the dc reference voltage, is applied via resistor R111 to the inverting input of operational amplifier OAC. Operational amplifier OAC compares the ac signal fedback to it against the ac ground presented at its non-inverting terminal by capacitor C2 and resistors R109 and R138. Operational amplifier OAC develops an ac feedback signal at its output which, along with the dc feedback signal, is fed to the base of the Darlington connected transistors Q101, Q102 via common base connected transistor Q105. The polarity of this ac feedback signal is such that it cancels out any ac signal that might be developed at the collector of transistors Q101, Q102, hence establishing the collector of the Darlington pair at virtual ac ground.

4. MAINTAINING LONGITUDINAL AC BALANCE—LOOP ON-HOOK

When the microprocessor determines that the subscriber loop is on-hook, it switches the NOHTA signal low, causing the line-feed circuit of FIG. 1 to enter the on-hook transmission state. In the on-hook transmission state, which may occur during the silent interval following the first two seconds of ringing when the line is being rung, information concerning the calling party's identity may be transmitted to the called party. During this period the called party would still be on-hook and there might be insufficient loop current through the Darlington connected transistors. Accordingly, in the absence of the circuitry about to be described, there would be no way for the Darlington transistors to provide the virtual ground for maintaining the ac longitudinal balance on the loop conductors nor would the Darlingtons be operative to provide current-limiting. While it might theoretically be possible to forward bias the Darlingtons by a dc connection to ground, variations in the Darlington collector current and in the HVBAT supply voltage due to manufacturing variations and less than ideal regulation, would make it impossible to ensure maintenance of the desired value of minimum Tip to Ring voltage in the on-hook mode. It is, however, a feature of the present invention to provide an alternative current path to enable the Darlington transistors to remain operative in the absence of loop current so that their collectors maintain a virtual ac ground on the Ring lead of the loop.

In the on-hook state microprocessor μ-P makes the NOHTA signal and the LVA signal low thereby calling into operation voltage regulated power supply VR and battery switch BS. In current limiter CL the low NOHTA signal changes the dc voltage established by resistor divider R116, R115 and R114 at the non-inverting input of comparator OAD to approximately +7.3 v dc and, in voltage regulator VR turns on transistor Q110 which turns on transistor Q109. Comparator OAD supplies a reference voltage to operational amplifier OAC that causes it to limit the drive to the Darlington transistors so that their collector current is limited to about 7 ma dc. This reduced current conserves power during on-hook transmission. When transistor Q109 is turned on it provides, at its collector, a voltage-regulated potential that is slightly below ground. From this potential a current may be drawn over a path including forward biased diode D5, resistor R42 and forward biased diode D13 to the collectors of the Darlington transistors Q102, Q101 in current limiter CL. With current through the Darlingtons longitudinal balance can be maintained even when there is no loop current, the Darlingtons operating in similar fashion to that in which they maintained a virtual ac ground when actual loop current was present.

The ground potential supplied at the collector of transistor Q109 of voltage regulated power supply VR is compensated for any ac variation in the potential of the HVBAT terminal as well as for any ac variation in the reference potentials seen by the comparators of current limiter CL. More particularly, the inverting input of comparator 3C of voltage regulated power supply VR and the non-inverting input of comparator OAD of current limiter CL are referenced to the same positive reference voltage (illustratively +12 volt); the inverting input of comparator 3C being connected to this supply through resistor R8 and the non-inverting input of comparator OAD being connected to the supply through resistor R116. On the other hand fluctuations in the potential of terminal HVBAT are sensed at the inverting input of comparator 3C through resistor R9 while fluctuations of this potential which affect the current through the Darlingtons (resulting in a variation in the potential drop across R101) are sensed at the non-inverting input of comparator OAA. In this manner fluctuation in the +12 volt supply and in the HVBAT supply affect current limiter CL and voltage regulated power supply VR in such a way as to cancel out the effects of variations in these two supplies.

When the NOHTA (high) control signal is supplied by microprocessor μ-P to initiate the normal mode of (off-hook) loop feed by the current limiter CL, as discussed above, the NOHTA control signal also turns off Q110 of the voltage regulated power supply VR. The turning off of transistor Q110 removes the drive current path for the base of transistor Q109 cutting this transistor off. With transistor Q109 cut off the current path to ground provided by voltage regulator VR to the Darlingtons is open-circuited, and the alternate source of current to the Darlingtons is removed.

5. PEAK CURRENT LIMITER

In addition to the regulation of the dc average loop current, the circuitry of FIG. 1 also incorporates a peak current limiter which is comprised of transistors Q104, Q108 and operational amplifier OAB and their associated resistors and capacitors. The peak current limiter protects the line-feed circuitry, particularly the Darlington transistors Q101, Q102 of current limiter CL as well as the Darlington transistors Q107 of battery switch BS. Transistors Q108 and Q104 comprise a dc voltage supply that is referenced to whichever of battery terminals HVBAT or LVBAT is selected by battery switch BS to power the loop. This dc voltage supply biases resistor divider R104, R105 to establish a potential at the non-inverting input of operational amplifier OAB. Should the peak current through R101 suddenly rise, the voltage drop across R101 will be sensed by resistor R133 and diode D4 and conveyed to the inverting input of operational amplifier OAB whose output through diode D3 reduces the drive to the Darlington transistors Q101, Q102. Feedback components C17, R133 and diode D4 form a fast attack/slow decay comparator which quickly limits the current through Q101, Q102. It should be noted that R133 and diode D4 provide a parallel path for applying any rapidly changing voltage drop across R101 to the inverting input of operational amplifier OAB. When the voltage at the inverting input exceeds that set by the reference at the non-inverting input, the output of amplifier OAB rapidly goes low, discharging C17 and forward biasing diode D3. When diode D3 becomes forward biased it rapidly sinks the Darlington's drive current provided by common base transistor Q105, shunting it away from the base of Q101, Q102 and thus turning them off. When the transient decays and the loop current falls below the prescribed threshold, the falling voltage at R101 is applied to the operational amplifier through R133 since diode D4 is now reverse biased. Operational amplifier OAB now becomes an integrator with time constant determined by C17 and R133. As the output of amplifier OAB slowly rises, diode D3 eventually becomes reverse biased and normal regulation of loop current by limiter CL resumes.

6. POWERING DOWN THE LINE-FEED CIRCUIT

When the microprocessor determines that the line-feed circuit should be powered down, it activates the NLFA signal. It may be desirable to power down the line-feed circuit in order to present an open switching interval (OSI) toward the subscriber loop, to prevent the line-feed circuit from loading the driver, FIG. 2 when the driver applies a burst of ringing to the loop or to deny service to the subscriber. When the NLFA signal is high, the open drain output of inverter V2C is driven low. This effectively shorts the emitter of transistor Q105 to ground, turning it off. With transistor Q105 turned off, there is no base drive for the Darlington transistors and resistor R103 pulls the potential of the base of the Darlington transistors to the potential of their emitter, thereby turning off the Darlingtons. With the Darlingtons rendered nonconductive, loop current ceases.

7. BATTERY SWITCH BS

In the on-hook state the requirement is that the Ring lead of the loop should be supplied by high voltage battery HVBAT. To supply high voltage battery to the Ring lead, the bottom of resistor R101 must be connected to the HVBAT terminal by turning on transistors Q107 of battery switch BS. Transistors Q107 are turned on by microprocessor μ-P making control signal LVA low, thereby turning on transistor Q106. With transistor Q106 turned on transistors Q107 are turned on, thereby connecting the bottom of resistor 101 the HVBAT supply terminal.

When the microprocessor determines that low voltage battery is to be supplied to the loop it makes the LVA signal high which turns off transistor Q106 of battery switch BS. Turning off transistor Q106 turns off transistors Q107, thereby open-circuiting the path from the bottom of resistor R101 to the HVBAT terminal. Loop current now flows through the Darlington connected transistors and resistor R101 to reach lead LVBAT through forward biased diode D2L.

When the microprocessor determines that high voltage battery is to be supplied to the loop it makes the LVA signal low, turning on transistor Q106. With transistor Q106 turned on, base drive is supplied to transistors Q107, turning them on. Loop current flowing through resistor R101 reaches terminal HVBAT through forward biased transistors Q107 and diode D2H. With transistors Q107 on, diode D2L is back-biased by the more negative potential at the collectors of transistors Q107 to isolate resistor R101 from the low voltage supply. Capacitor C4 and resistor R128 form an integrator feedback network around transistors Q107 to slow the transition between the two supplies in order to minimize any transient impulse noise associated with the switching between the battery supplies.

8. RINGING CIRCUITRY—FIG. 2

Microprocessor μ-P, FIG. 1, generates two control signals for the ringing driver circuitry shown in FIG. 2. The 20HZA signal is a 20 Hz clock signal with a duty cycle of 20 ms high and 30 ms low. The duty cycle of this clock, along with the slew-rate of the driver, provides the ringing waveform with desirable values of dc voltage, ac rms voltage, and crest factor. The RGENA signal provided by the microprocessor is an enable signal that allows the ringing driver to be turned off and put into a high impedance state so that it will not load the Ring conductor when the line is not being rung. This permits the ringing driver to be connected directly to the Ring conductor without the need for a series isolating element such as an electromechanical relay or comparable solid state device. The nature of the ringing driver allows the use of a simple ring trip detector comprised of a voltage comparator and duty cycle detector.

The ringing driver is shown in FIG. 2. The 20HZA clock signal from microprocessor μ-P is gated by the enable signal RGENA and applied to the base of positive side ringing driver transistor Q169. The same 20HZA clock signal is inverted and applied to the base of negative side ringing driver transistor Q168. The positive and negative side circuits of the ringing driver therefor operate in push-pull. When the base of transistor Q169 is pulled low, Q169 turns on, thus turning on Q167. Voltage divider resistors R165, R167 located in the collector circuit of transistor Q167 establish a base voltage at transistor Q165 which results in a fixed current through Q165. This fixed current is approximately equal to the base voltage of Q165 divided by emitter resistor R163 allowing capacitor C161 to charge, thereby producing a linear ramp voltage at the collector of Q165. This ramp voltage is buffered by the source-follower mosfet Q161 and applied through resistor R53A to lead PRA and thence to the Ring conductor, FIG. 1. A peak current limiter circuit, comprised of transistor Q163, zener diode D63 and resistor R53A limits the ringing current so supplied to lead PRA. The positive ringing driver therefor pulls the voltage divider on the Ring conductor toward ground with a well-controlled slew rate, illustratively, 17.5 v/ms. Similarly, on alternate half-cycles, the negative driver, comprised of transistors Q168, Q166 and source follower mosfet Q162, drives the voltage on the Ring conductor toward VRNG, illustratively −175 v dc, with an equal slew rate. The resultant ringing voltage is a trapezoidal waveform with approximately 70 v rms, −69 v dc and a crest factor of 1.44.

When not in use, the ringing driver is placed in a high impedance state through the use of opto-isolators U6A and U6B whose series-connected gates are driven by the RGENA signal from microprocessor μ-P. Opto-isolators U6A and U6B have their source electrodes each connected to lead PRA via resistors R53A and R53B, respectively. The opto-isolators are both turned on by RGENA going low, forcing the gate-to-source voltages of output mosfet transistors Q161 and Q162 to approximately zero, thus preventing source current from flowing in either device, regardless of the voltage appearing on their sources (i.e., the Ring conductor). The voltage isolation provided by the opto-isolators permits control of the gate-to-source voltages of the output mosfet transistors Q161, Q162 from the microprocessor RGENA signal, which is a logic level source, without regard to the voltages presented at the output transistors.

9. RING TRIP

It was mentioned above that the ringing driver includes a peak current-limiting feature for the negative half of the driver. The current limit threshold is advantageously set so that the driver can provide the maximum current required for most practical applications without current-limiting. However, when a dc termination of less than or equal to a minimum value, illustratively 430 ohms, is placed across the Tip and Ring, the current limiter turns on and limits the current flowing into the load. The current-limiting action also causes the voltage at the output of the ringing driver to limit whatever peak current limit is reached. Thus, by monitoring the voltage at the ringing driver output, the ring trip condition can be detected. Comparator C3D is designed so that its output, NRTA, switches each time the output of the ringing driver crosses a certain negative voltage threshold. Thus, when the line is being rung with an appropriate load, the output of comparator C3D is a 20 Hz clock waveform with a duty cycle determined by the slicing level of the comparator.

When the loop goes off-hook, the low dc impedance on the line causes the current limiter to turn on each cycle, limiting the output current and clipping the voltage at the driver output. The comparator slicing level is advantageously selected so that when this occurs, the threshold is not crossed and therefore its output stops switching. The microprocessor, which monitors the duty cycle of the ring trip detector output waveform, senses that the duty cycle has been reduced, or reduced to zero, and declares the ring trip condition. Because of the nature of the ring trip detector, i.e., it effectively measures the voltage of the ringing waveform on a cycle by cycle basis, it is possible to detect failures of the ringing driver and associated power supply should this unlikely event occur. Since the ring trip detector output continually undergoes transitions during ringing, monitoring of the output can be taken as a signal to not apply ringing if the transitions are not present.

10. CHANNEL TESTING a. DC TERMINATION TEST

The break contacts of relay K1 shown in the upper righthand corner of FIG. 1 disconnect Tip and Ring conductors TA, RA of the loop from the line-feed circuit while the make contacts of this relay connect test resistor termination R487 across the secondary winding of line transformer LT in series with mosfet transistor Q2. Transistor Q2 is turned on by the NTRM signal issued by microprocessor μ-P. When turned on, transistor Q2 completes the dc current path across the Tip and Ring conductors. This dc current path causes loop current to flow in the line-feed circuit which, in turn, causes an off-hook condition to be detected by the switchook detection circuit discussed above.

b. RINGING TEST

The test of the ringing circuit is the detection of the presence of ringing after the ringing command is given. The detection of ringing is made by a circuit which is very similar to the ringing trip circuit described above and includes a comparator C3A that monitors the voltage on the Ring conductor appearing on lead CR at the upper lefthand side of FIG. 2. The threshold of the comparator is set such that it is crossed in each direction on every cycle of the 20 Hz ringing waveform. The output of comparator C3A is a 20 Hz waveform whose duty cycle is a function of the comparator threshold and the ringing waveshape and amplitude. When ringing is applied, the microcomputer monitors the duty cycle of the comparator output waveform on lead RWF. After a suitable number of cycles of detected ringing, ring trip may be tested by the microprocessor making lead NTRM high to turn on transistor Q2 to connect terminating resistor R487 across the Tip and Ring conductors. With the resistive termination across the loop, the ring trip circuitry should respond, causing ringing to be tripped.

What has been described is deemed to be illustrative of the principles of the present invention. Numerous modifications may be made by those skilled in the art without however departing from the spirit and scope thereof.

TABLE I

| Microcontroller Signal Lead | Microcontroller Input/Output | Functional Description |
| --- | --- | --- |
| NOHA | I | Loop not off-hook; output from swhk detector low when detector senses off-hook while in normal line-feed mode; |
| NSOHA | I | Not scan off-hook output fr OHT detector; low when detector senses off-hook; |
| NRTA | I | Not Ring trip; output fr ring trip detector; High when detector senses off-hook while in ringing mode. |
| NRGD | I | Not ringing detected; output from the ringing detector in the channel test circuit; low when ringing is detected; |
| LVA | O | Low voltage battery selector input for Battery Switch; when high, LV battery is applied to line-feed; When low, HV battery is applied to line-feed; |
| NOHTA | O | Not on-hook transmission; Input to line-feed that selects OHT mode; low to select OHT mode, high to select normal feed mode; |
| NLFA | O | Not line-feed; Input to circuitry that disables line-feed; High to disable line-feed; |
| TSTRA | O | TEST RELAY Input to test relay driver; high to enable driver; |
| RGENA | O | Ringing enable input to ringing driver; High to enable |

TABLE I-continued

| Microcontroller Signal Lead | Microcontroller Input/Output | Functional Description |
| --- | --- | --- |
| | | driver; |
| NPDIA | O | Not power down input; power down input; low to power down; |
| NTRM | O | Not terminated; input to circuit that causes a DC termination with an absorptive ac termination to be applied to the channel under test; low to apply termination; |
| 20HZA | O | 20 Hz clock ch A; 20 Hz clock input to ringing driver; Nominal duty cycle is 2/3 high, 1/3 low; |

What is claimed is:

1. A ringing circuit for a telephone subscriber loop including a ring conductor comprising:

a source of ringing clock signals having a predetermined duty cycle;

positive side ringing driver means for producing a linear positive ramp voltage having a controlled slew rate;

negative side ringing driver means fox producing a linear negative ramp voltage having a controlled slew rate;

means for applying said clock signal to said positive side driver means and for inverting and applying said clock signal to said negative side ringing driver means to operate said positive and negative side ringing driver means in push-pull in accordance with said duty cycle; and means for alternately connecting each said ringing driver means to the ring conductor of said loop.

2. A ringing circuit for a telephone subscriber loop according to claim 1 wherein said positive and said negative ringing driver means includes:

common capacitor means; and
means for producing a fixed charging current for said capacitor means to produce said positive and said negative linear ramp voltage having said controlled slew rate.

3. A ringing circuit for a telephone subscriber loop according to claim 2 wherein said positive side ringing driver means pulls said one conductor toward ground potential at a predetermined slew rate and said negative side ringing driver pulls said one conductor toward a high negative potential at said predetermined slew rate to produce a trapezoidal ringing waveform on said one conductor.

4. A ringing circuit for a telephone subscriber loop according to claim 3 wherein said means for applying each said ramp voltage to said one conductor includes a mosfet output transistor respective to each said ringing driver means.

5. A ringing circuit for a telephone subscriber loop according to claim 4 including logic level signaling means for placing said mosfet output transistor in a high impedance state.

6. A ringing circuit for a telephone subscriber loop according to claim 5 wherein said logic level signaling means for placing said mosfet output transistor in said high impedance state includes an opto-isolator (U6A, U6B) for zeroing out the gate-to-source voltage of said mosfet irrespective of the voltage at said source.

7. A ringing circuit for a telephone subscriber loop according to claim 4 including means for limiting the peak current supplied to said one conductor of said loop by said respective mosfet output transistor.

8. A ringing circuit for a telephone subscriber loop according to claim 7 wherein said current limiter is triggered into operation by the off-hook condition of said loop.

9. A ringing circuit for a telephone subscriber loop according to claim 7 further including comparator means (C3D) for monitoring the voltage at the ringing driver output on a cycle by cycle basis to detect the ring trip condition.

10. A ringing circuit for a telephone subscriber loop according to claim 9 wherein said comparator means (C3D) produces an output signal (NRTA) which switches each time the output of the ringing driver crosses a predetermined negative voltage threshold.

11. A ringing circuit for a telephone subscriber loop according to claim 7 including means for monitoring the duty cycle of the voltage at said ringing driver output to detect the ring trip condition.

12. A ringing circuit for a telephone subscriber loop according to claim 11 wherein the duty cycle of said output signal is determined by the slicing level detected by said comparator.

* * * * *